United States Patent [19]
Casady

[11] 3,893,576
[45] July 8, 1975

[54] ROTATING PLATFORM ELEVATOR

[76] Inventor: Chris D. Casady, 1627 Linnea Ave., Eugene, Oreg.

[22] Filed: Sept. 17, 1973

[21] Appl. No.: 397,679

[52] U.S. Cl. .............................. 214/75 R; 214/672
[51] Int. Cl. ............................................ B60p 1/44
[58] Field of Search ...... 214/1 BB, 1 BH, 75 R, 730, 214/731, 672; 74/25; 4/185 L; 297/349

[56] References Cited
UNITED STATES PATENTS

| | | | |
|---|---|---|---|
| 2,148,932 | 2/1939 | Fisher | 214/75 R |
| 2,762,519 | 9/1956 | Ruppe et al. | 214/730 |
| 3,516,559 | 6/1970 | Walter | 214/75 R |
| 3,651,965 | 3/1972 | Simonelli et al. | 214/75 R |
| 3,750,815 | 8/1973 | Haven | 214/730 |
| 3,757,963 | 9/1973 | Binkley | 214/1 BH |

Primary Examiner—Robert J. Spar
Assistant Examiner—Lawrence J. Oresky
Attorney, Agent, or Firm—Eugene D. Farley

[57] ABSTRACT

A rotating platform elevator for use particularly by wheelchair occupants in ascending and descending from a motor vehicle comprises a vertical support post and a sleeve slidably mounted on the post. A platform is mounted on the sleeve. A drive is connected to the sleeve or platform for reciprocating them between raised and lowered positions. Cam means interconnect the post and sleeve and operate to rotate the sleeve and platform in a horizontal plane through a selected angle of rotation at a predetermined elevation of the platform.

1 Claim, 4 Drawing Figures

ROTATING PLATFORM ELEVATOR

BACKGROUND OF THE INVENTION

This invention relates to rotating platform elevators. It pertains particularly to rotating platform elevators of the class employed in conjunction with a motor van or other vehicle and used by wheelchair occupants for ascending into and descending from the vehicle without assistance from other persons. The invention is described with particular reference to this application, although no limitation thereby is intended since the elevator may also be used in any situation where it is desired to lift a load and rotate it horizontally through a selected angle of rotation, as in the case of campers, mobile homes, and cargo carrying trucks. It also may be used on vehicles, or stationary supports provided with doors or openings variously located and variously designed.

Although numerous types of hoists and lifts heretofore have been devised, there is a need for one designed especially for use by wheelchair occupants entering and leaving a motor vehicle, particularly a van-type motor vehicle having a side-opening door. Such a vehicle has a cargo space of substantial area provided with a flat floor merging with a driver and passenger area in which a swivel-type driver seat is mounted.

Accordingly, if an appropriate elevator is associated with the side-opening door, a handicapped person requiring a wheelchair can drive the van to the selected parking location, for example, a curb adjacent to a sidewalk; park the van next to the sidewalk; shift from the driver's seat of the van into his wheelchair; move the wheelchair across the flat van floor onto the elevator; and lower himself to the sidewalk along which he can propel himself in the usual manner. Upon his return to the van, he reverses the foregoing sequence.

The provision of a suitable elevator for association with a van-type vehicle thus would make the handicapped person completely independent of the assistance of others in getting from place to place. He then would be able to use the van for business, travel or recreational purposes as desired.

In order to be suitable for such use, however, the elevator associated with the side opening van door must be operable in two planes, i.e. it must pivot in a horizontal plane from inside the van to the outside thereof, and thereafter descend and ascend vertically as required to transport the wheelchair and its occupant to and from the ground.

It accordingly is the general purpose of the present invention to provide such an elevator for use particularly in association with the side opening door of a motor driven van, but useful also with other types of vehicles and permanent installations, which elevator is characterized by the following features and advantages:

It is adaptable for use with a wide variety of vehicles and in a wide variety of situations.

It may be used on both level and sloping ground.

It is stable and securely braced on all sides.

It may be used safely by handicapped persons.

It is self-contained within the van.

It occupies but little space, so that a van mounting it can carry substantially its normal load.

It does not block the operator's view from the driving station.

It can carry heavy loads even when operated solely from the battery of a motor vehicle on which it is mounted.

It may be stopped in its downward descent in any vertical position for easy access to the curb on ground, regardless of the height of the latter.

It gives a person who requires a wheelchair a condition of complete independence so that he is able to get into his van, drive where he wants to go, park, and leave the van, all without help from another person.

It is simple in operation, relatively maintenance free, reasonable in cost and easily and quickly installed in the operating location.

SUMMARY OF THE INVENTION

The foregoing and other objects of the invention are accomplished by the provision of an elevator of the class of rotating platform elevators comprising broadly, in combination, a vertical support post adapted to be mounted in a stationary position on the van adjacent the side opening door thereof, a sleeve slidably mounted on the post, and a platform mounted on the sleeve. A fluid pressure cylinder or other suitable drive is connected to the sleeve or the platform for reciprocating the same between raised and lowered position on the support post. Cam means interconnects the post and the sleeve. It is operative to rotate the sleeve and the platform in the horizontal plane through a selected angle of rotation at a predetermined elevation of the platform, for example, at the floor elevation of the van, thereby enabling swinging the platform in and out of the van door.

THE DRAWINGS

Considering the foregoing in greater detail and with particular reference to the drawings wherein:

FIG. 3 is a fragmentary detail view in elevation, partly in section, and looking in the direction of the arrows of line 3—3 of FIG. 1; and FIG. 4 is a transverse sectional view taken along line 4—4 of FIG. 3.

DESCRIPTION OF A PREFERRED EMBODIMENT

Figure 1:
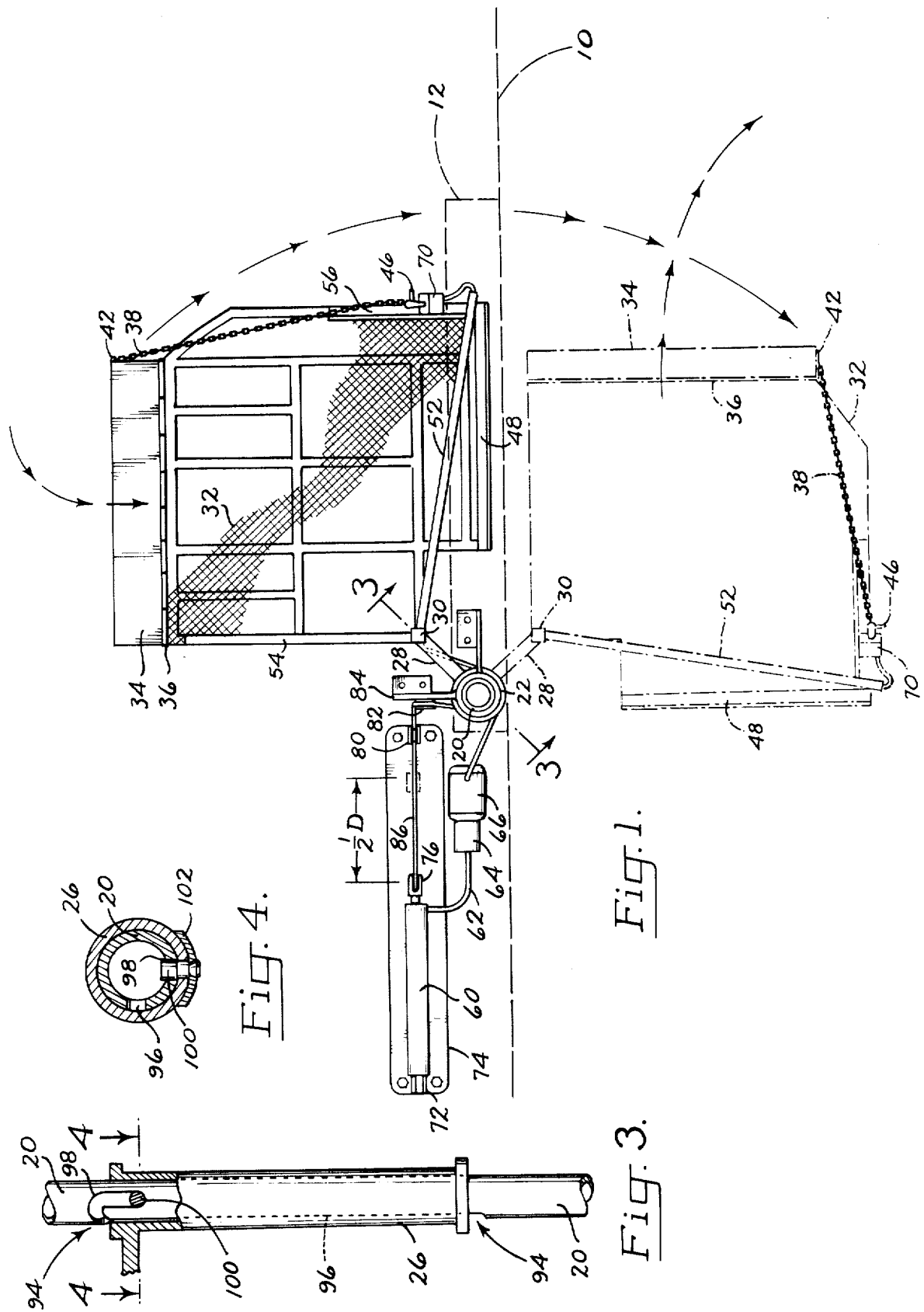
FIG. 1 is a plan view of the herein described rotating platform elevator.
Figure 2:
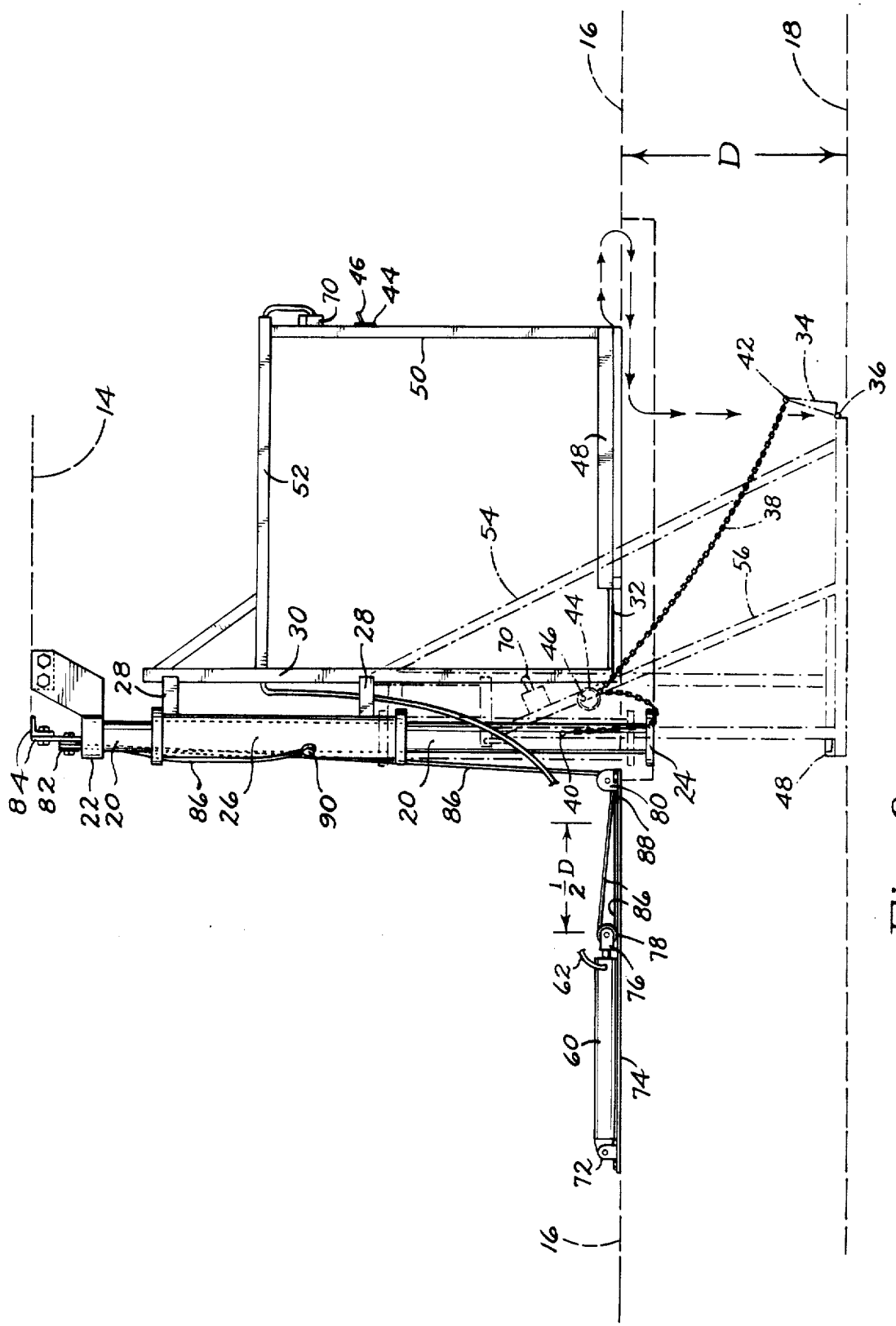
FIG. 2 is a view in side elevation thereof.

In FIGS. 1 and 2 the rotating platform elevator of my invention is illustrated in its application to a van, the side of which is indicated by dashed line 10, and the side opening door area of which is indicated by dashed line 12 of FIG. 1. The van ceiling level is indicated by dashed line 14 of FIG. 2; its floor level by dashed line 16; and the ground level by dashed line 18. The elevator is indicated in full lines in its storage position within the van, resting on the van floor. It is indicated in dashed lines in its use position outside the van and resting on the ground.

The elevator is supported on a substantial, vertically arranged post which, in the illustrated form of the invention, comprises a length of heavy pipe 20. The pipe is supported in its vertical position by means of top and bottom brackets 22 and 24, respectively, bolted or otherwise affixed to the frame of the vehicle.

Post 20 mounts a vertically slidable sleeve 26. The sleeve in turn supports, by means of integral arms 28, a vertical bar 30. Bar 30 supports a horizontal platform 32.

The platform has dimensions and a capacity suitable for the intended purpose. In the illustrated embodiment, and for the sake of safety, strength and lightweight, it comprises a floor member manufactured from expanded metal. Such metal has the ancillary advantage of cleaning the wheels of a wheelchair as they pass across.

Platform 32 has at its entry side a short plate 34 connected to the side of the platform by means of a hinge 36. The plate is adjustable between raised and lowered positions by means of a chair 38, one of the ends of which is attached by means of a peg 40 to a strucural member and the other of the ends of which is attached by means of a pin 42 to the lip of plate 34. The chain has intermediate its ends a ring 44 adapted to be grasped by the operator and mountable, when not in use, on a support pin 46.

Plate 34 is adjustable by means of chain 38 between a lowered position in which it serves as a ramp for entry onto the platform, and a raised position in which it serves as a stop, preventing a wheelchair from rolling off the rear of the platform.

A companion stop 48 is positioned at the back of the platform and prevents the wheelchair from rolling off on that side of the platform.

The platform is suitably braced, supported and confined by means of a vertical post 50, a horizontal rail or bar 52 connecting the upper end of post 50 with support post 30, a first diagonal brace 54, and a second diagonal brace 56.

Drive means is provided for reciprocating the platform between raised and lowered positions.

In the illustrated form of the invention, the drive means comprises a fluid pressure cylinder 60 which preferably is hydraulically operated. The cylinder may be single acting, applying pressure to the platform in a lifting direction, and permitting the platform to descend gravitationally.

The hydraulic circuit supplying cylinder 60 with hydraulic fluid under pressure includes a pressure conduit 62 interconnecting the cylinder with a combination pump and reservoir 64. The pump is driven by an electric motor 66 supplied with electricity from the battery of the vehicle and operated by means of a control switch 70. The latter is mounted on a frame member of the elevator, convenient to the operator.

Cylinder 60 and its associated motor drive may be mounted on the floor 16 of the van along a side wall thereof, where it is out of the way and does not interfere with the use of the van cargo space. Its base is trunion mounted to a pair of brackets 72 bolted to a support plate 74. Its piston rod mounts a crosshead 76 in the form of a clevis mounting a pulley and cable connecting assembly. The latter includes pulley 78 rotatably mounted on the crosshead of the cylinder, a second pulley 80 rotatably mounted at the forward end of plate 74 and a third pulley 82 rotatably mounted on a bracket 84 affixed to the roof or a frame member of the vehicle.

A cable 86 deadends at one of its ends on a securing member 88 fixed to plate 74. The cable is reversely looped around pulley 78 thereby giving a two fold mechanical advantage, and then passes around pulley 80, over pulley 82 and deadends at its other end on a pin 90 on sleeve 26.

Cylinder 60 working in the elevating position and cooperating with gravitational forces working in the lowering direction achieves the raising and lowering of the platform.

Means also is provided for rotating the platform in the horizontal plane through a selected angle of rotation at a predetermined platform elevation. In the illustration, the selected angle is about 90° and the predetermined elevation is that elevation which enables the platform to clear the floor of the van as it swings horizontally through a 90° arc. Additionally, the means employed for swinging the platform embodies means for raising the platform slightly higher than is necessary to clear the van floor while the platform is outside the van, then lowering the platform to about the elevation of the van floor after it has swung into the van.

Cam means associated with post 20 and sleeve 26 is provided for this purpose and is illustrated particularly in FIGS. 3 and 4.

As illustrated, the cam means includes a vertical area of post 20, defined by a guide slot, indicated generally at 94. The guide slot is in the form of an inverted J. The longer leg of the slot bridges the distance between ground level and the maximum height to which the platform is to ascend, i.e. the distance between ground level and van floor level plus a clearance increment. The short leg of the slot spans the distance between the maximum elevation of the platform and the elevation of the van floor. The longer leg is indicated at 96; the shorter leg, at 98. Both ends of the slot are closed off and thus provide stops.

Cooperating with the cam defined by slot 94 is a cam follower 100. This comprises a substantial pin dimensioned to penetrate the side wall of sleeve 26 and a reinforcing pad 102, by both of which it is supported, and to enter slot 94. Its action is such that as the platform is elevated to its maximum height by the operation of fluid pressure cylinder 60, cam follower 100 travels vertically along leg 96 of the slot until it reaches the upper end. As the platform coasts along of its own momentum, the arcuate portion of the guide slot guides cam follower 100 into the shorter leg 98 of the slot, whereupon the platform descends gravitationally to the van floor with cam follower 100 in its FIG. 3 position.

OPERATION

The operation of the herein described rotating platform elevator is as follows: Assuming that the operator of the van has parked his vehicle at the desired location and wishes to leave the van, he swivels the driver's seat around, unfolds and positions his wheelchair, and transfers to the latter. He then wheels himself onto the platform of the elevator, following the short arrowed line of FIG. 1.

When he is thus located on the platform of the elevator, he lifts ramp 34 to its elevated position by means of chain 38. He then energizes pump motor 66 by means of operating switch 70. Fluid pressure cylinder 60 lifts the platform sufficiently so that cam follower 100, which originally is in its FIG. 3 position, travels to the extreme upper end of slot 94 where it is guided into the longer, vertical leg 96 of the slot. This accomplishes a 90° rotation of the elevator, indicated by the looped arrows of FIG. 2.

The elevator descends gravitationally to the dashed line position in FIG. 2, where the platform rests on the ground. The operator then lowers ramp 34 by adjustment of chain 38 with ring 44 and wheels himself off the platform. When he wishes to return to the van, he reverses the foregoing procedure. He thus is able to travel from place to place with complete independence and without serious interference with the normal functions of the vehicle in which the elevator is mounted.

Having thus described my invention in preferred embodiments, I claim:

1. A rotating platform elevator comprising:
   a. a vertical support pipe,
   b. securing means for securing the support pipe to a structural member,
   c. a sleeve slidably mounted on the pipe,
   d. platform means mounted on the sleeve,
   e. drive means connected to the sleeve or platform for reciprocating them between raised and lowered positions relative to the support pipe, and
   f. cam means interconnecting the pipe and the sleeve and operative to rotate the sleeve and the platform in a horizontal plane through a selected angle of rotation at a predetermined elevation of the platform, the cam means comprising a vertical slot on the pipe having a reverse turn in its upper end and a cooperating cam follower fixed to the sleeve and received in the slot, the slot having a J shape with the leg of the J corresponding to the position of the platform inside the vehicle being shorter than the leg of the J corresponding to the position of the platform outside the vehicle, whereby the platform may be lowered slightly in the inside position of the platform.

\* \* \* \* \*